United States Patent [19]

Bauer et al.

[11] Patent Number: 4,654,279
[45] Date of Patent: Mar. 31, 1987

[54] INTERPENETRATING-NETWORK POLYMERIC ELECTROLYTES

[75] Inventors: Barry J. Bauer, Germantown; Chwan-Kang Chiang; George T. Davis, both of Gaithersburg, all of Md.

[73] Assignee: The United States of America as represented by the Secretary of the Navy, Washington, D.C.

[21] Appl. No.: 884,143

[22] Filed: Jul. 10, 1986

[51] Int. Cl.$^4$ .............................................. H01M 6/18
[52] U.S. Cl. .................................... 429/192; 429/199; 252/62.2
[58] Field of Search ................. 429/192, 191, 199, 33, 429/30; 252/62.2

[56] References Cited
U.S. PATENT DOCUMENTS

| | | | |
|---|---|---|---|
| 4,303,748 | 12/1981 | Armand et al. ...................... | 429/192 |
| 4,357,401 | 11/1982 | Andre et al. ........................ | 429/192 |
| 4,471,037 | 9/1984 | Bannister .......................... | 429/192 X |
| 4,547,440 | 10/1985 | Hooper et al. ...................... | 429/112 |
| 4,556,614 | 12/1985 | Mehaute et al. ................. | 429/192 X |
| 4,576,882 | 3/1986 | Davis et al. ........................ | 429/192 |
| 4,589,197 | 5/1986 | North ............................... | 429/192 X |

Primary Examiner—Anthony Skapars
Attorney, Agent, or Firm—Kenneth E. Walden; Roger D. Johnson

[57] ABSTRACT

A solid polymeric electrolyte which is a two phase interpenetrating network of a mechanically supporting phase of a continuous network of a crosslinked polymer and an ionic conducting phase comprising a metal salt complexing liquid polymer which is a liquid poly(ethylene oxide), poly(propylene oxide), or poly(ethylene imine) complexed with a suitable metal salt. The mechanically supporting phase forms a matrix which supports the interpenetrating ionic conducting liquid polymer phase which provides continuous paths of high conductivity in all directions throughout the matrix.

13 Claims, 2 Drawing Figures

INTERPENETRATING-NETWORK POLYMERIC ELECTROLYTES

BACKGROUND OF THE INVENTION

This invention relates to battery electrolytes and more particularly to solid polymeric electrolytes.

Solid electrolytes have been shown to be a practical substitute for aqueous electrolytes in electrochemical cells or batteries wherein the electrolytes have been $Ag_3SI$, one of the family $MAg_4I_5(M=K, Rb, Cs)$, or one of the beta-aluminas, $M_2O.11Al_2O_3(M=Li, Na, K, NH_4, Tl, Ag$, etc.). Polymers offer the potential of being used as solid electrolytes because of their ability to be formed into thin films and the ability of some polymers to dissolve salts and transport ions. Polymers electrolytes offer the advantage of being readily prepared in thin films of large area both of which reduce cell resistance and allow large current drains at low current densities.

The desirable properties for solid polymeric electrolyte includes both high ionic conductivity and good mechanical strength. Attempts to increase ionic conductivity by lowering the molecular weight or the glass transition temperature result in specimens that are too fluid or mechanically weak films. Crosslinking can lead to stronger films, but the conductivity drops. The largest research effort has been on single phase high polymers with capability to dissolve salts and to form polymer-salt complexes. However, the conductivity of these polymer systems is only at the order of $1 \times 10^{-6}$ S/cm at room temperature.

SUMMARY OF THE INVENTION

Accordingly, it is an object of this invention to provide new solid electrolytes.

Another object of this invention is to provide new polymeric electrolytes.

A further object of this invention is to provide polymeric electrolytes that have high conductivities at room temperature and which have good mechanical strength.

These and other object of this invention are accomplished by providing:

a solid polymeric electrolyte comprising a two phase interpenetrating polymer network of (1) a mechanically supporting phase of a continuous network of a crosslinked polymer selected from the group consisting of epoxies, polyurethanes, polymethacrylates, polyacrylates, polyacrylonitriles, and polystyrenes; and (2) an ionic conducting phase comprising (a) a metal salt complexing liquid polymer selected from the group consisting of poly(ethylene oxide), poly(propylene oxide), poly(ethylene imine), and mixtures thereof, complexed with (b) a metal salt selected from the group consisting of LiI, LiBr, LiClO$_4$, CsClO$_4$, NaI, NaBr, CsI, CsBr, KI, KBr, LiCF$_3$SO$_3$, LiSCN, CsSCN, NaSCN, KSCN, AgNO$_3$, CuCl$_2$, CoCl$_2$, Mg(ClO$_4$)$_2$, PbBr$_2$, MgCl$_2$, and mixtures thereof, wherein from more than zero to 0.50 moles of metal salt are added per mole of monomer repeat unit of the metal salt complexing liquid polymer;

wherein the mechanically supporting phase comprises from 20 to 55 weight percent of the solid polymeric electrolyte with the ion conducting phase being essentially the remainder, and wherein the mechanically supporting phase forms a matrix which supports the interpenetrating ionic conducting phase which provides continuous paths of high conductivity in all directions throughout the matrix.

BRIEF DESCRIPTION OF THE DRAWINGS

FIGS. 1 and 2 are discussed in more detail in the experimental section.

DETAILED DESCRIPTION OF THE PREFERRED EMBODIMENT

Figure 1:
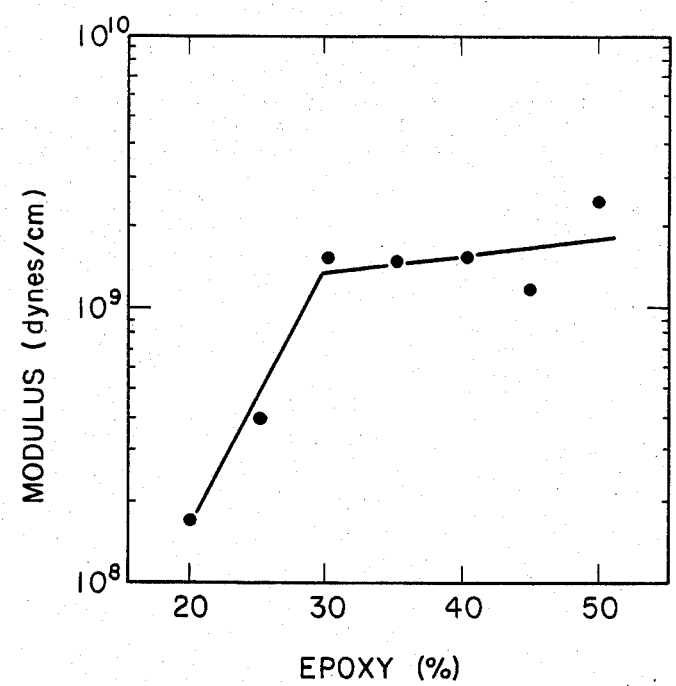
FIG. 1 shows a plot of modulus versus epoxy content for mixtures of a epoxy polymer and a complex of a low molecular weight polyethylene oxide with 10 mole percent of LiClO$_4$.

The solid polymer electrolyte of the present invention comprises an interpenetrating network of two co-continuous phases. One of the phases is a crosslinked polymer which provides the mechanic support matrix for the free standing solid polymer electrolyte. The other is an ionic conducting phase which comprises a metal salt and a metal salt complexing liquid polymer. The ionic conducting phase provides continuous paths of high ionic conductivity in all directions throughout the solid polymer electrolyte.

The ionic conducting phase comprises a metal salt and a metal salt complexing liquid polymer. The liquid polymer is poly(ethylene oxide), $(CH_2CH_2O)_n$; poly(propylene oxide), $(CH(CH_3)CH_2O)_n$; or poly(ethylene imine), $(CH_2CH_2NH)_n$. Poly(ethylene oxide) and poly(propylene oxide) are preferred because they are liquids at higher molecular weights than poly(ethylene imine). The term "liquid" in this specification covers the range from free flowing liquids up through very viscous liquids or gelatinous materials which can not form free standing structures by themselves. The more free flowing metal salt complexing liquid polymers are preferred because they provide greater conductivity when complexed with a salt. The molecular weight of the metal salt complexing polymer is not critical as long as the polymer is a liquid.

The metal salt used may be any of those used in the prior art with high molecular weight solid poly(ethlene oxide), poly(propylene oxide), and poly(ethylene imine) polymers. Metal salts which may be used include LiI, LiBr, LiClO$_4$, CsClO$_4$, NaI, NaBr, CsI, CsBr, KI, KBr, LiCF$_3$SO$_3$, LiSCN, CsSCN, NaSCN, KSCN, AgNO$_3$, CuCl$_2$, CoCl$_2$, Mg(ClO$_4$)$_2$, PbBr$_2$, MgCl$_2$, and mixtures thereof. Preferred salts are LiI, LiBr, LiClO$_4$, NaI, NaBr, LiCF$_3$SO$_3$, LiSCN, NaSCN, KSCN, PbBr$_2$, and MgCl$_2$. More preferred are LiI, LiClO$_4$, NaI, NaBr, and LiCF$_3$SO$_3$, with LiClO$_4$ and LiCF$_3$SO$_3$ being still more preferred.

From more than zero to 0.50, preferably from 0.01 to 0.30, more preferably from 0.03 to 0.10, and most preferably about 0.05 moles of metal salt are added per mole of monomer repeat unit ($-CH_2CH_2O-$, $-CH(CH_3)CH_2O-$, or $-CH_2CH_2NH-$) are used. The addition of even a small amount of salt greatly increases the conductivity of the complexing polymer. The conductivity peaks at 0.05 moles of salt per mole of monomer repeat unit and then gradually decreases with increasing salt concentration.

The sole function of the crosslinked polymer is to provide the mechanical support necessary to make the solid polymer electrolyte free standing. However, it is also necessary that the metal salt complexing polymer will be soluble with the uncured monomers which will form the crosslinked polymer. Suitable crosslinking polymer systems include the epoxies, polyurethanes, polymethacrylates, polyacrylates, polyacrylonitrile, and polystyrene, with the epoxies, polymethacrylates, polyacrylates, and polyacrylonitrile being preferred, and with poly(methyl methacrylate) and polyamine cured epoxies being more preferred.

The solid polymeric electrolyte of this invention comprises from 20 to 55, preferably from 25 to 40 and more preferably from 28 to 35 weight percent of mechanically supporting crosslinked polymer phase, with the remainder of the solid polymeric electrolyte being essentially the ionic conducting phase of the metal salt and the metal salt complexing liquid polymer. When less than 20 weight percent of crosslinked mechanically supporting polymer is used, the polymeric electrolyte is usually too weak to be free standing. On the other hand, more than 55 weight percent of the crosslinked mechanically supporting polymer produces a solid polymeric electrolyte with too low of a conductivity. Solid polymer electrolytes in the preferred range of from 25 to 40 weight percent of the crosslinked mechanically supporting polymer will generally possess a combination of good mechanical strength and good ionic conductivity. The combination of mechanical strength and ionic conductivity is maximized in the range of from 28 to 33 weight percent of the crosslinked mechanically supporting polymer with the remainder being essentially the metal salt complexed liquid polymer ionic conducting phase.

The ionic conducting interpenetrating polymer networks which form the solid polymer electrolytes of this invention can be prepared as follows. A solution of the metal salt, salt-complexing liquid polymer, and monomer starting materials for the crosslinked support polymer in a suitable polar solvent (such as acrylonitrile) is prepared. The solvent is then evaporated off in vacuum at room temperature, leaving a dry layer of an intimate mixture of the metal salt-complexed liquid polymer and the monomeric starting materials for the crosslinked polymer. The dried mixture is then cured by conventional methods to produce the crosslinked polymer. For instance in example 1 the mixture is heated at 95° C. for 18 hours to produce the poly(propylene oxide) triamine cured, crosslinked epoxy resin. In example 2, the poly(methyl methacrylate) is cured in a pressure bomb at 90° C. for 15.5 hours.

The general nature of the invention having been set forth, the following examples are presented as specific illustrations thereof. It will be understood that the invention is not limited to these examples but is susceptible to various modifications that will be recognized by one of ordinary skill in the art.

EXAMPLE 1

Epoxy/LiClO$_4$-poly(ethylene oxide)

Poly(ethylene oxide), MW=400 (Aldrich Chemical Co.), and 10 mole percent lithium perchlorate were dissolved in spectro grade acetonitrile to form a 5 weight percent solution. The poly(ethylene oxide)(-PEO) solution was mixed with the epoxy, diglycidylether of bisphenol A (Dow DER-332) and crosslinker, poly(propylene oxide) triamine (Texaco Jeffamine T-403). (Note: The *Handbook of epoxy resins*, (McGraw-Hill Book Company, New York, 1967), Henry Lee and Kris Neville, page 4–60 defines Dow Chemical Company's DER-332 as a pure, liquid DGEBA resin having an epoxy equivalent weight of 172–176 and a viscosity of 4000–5000 centipoises at 25° C.) Acetonitrile was evaporated at room temperature in vacuum. The dried mixture was cured at 95° C.

The electrical conductivity of the polymers was measured using the AC impedance method. The electrodes were a pair of stainless steel plates pressed against the surface of the polymer films (15 mm×15 mm). The specific conductivity of the sample was deduced by varying the AC frequency from 100 Hz to 13 MHz. The frequency data was also used to examine the relaxation mechanism of the polymer. Compression modulus was measured by placing a series of dead weights on the sample. The displacement of sample was measured 30 seconds after each weight was applied. The modulus of the polymer was computed by least square fitting the force and displacement.

The pure epoxy is a semi-transluscent rigid solid with conductivity less than $10^{-12}$ S/cm at room temperature. The epoxy containing the PEO-salt complex phase is a milky white solid. For less than 20 weight percent epoxy phase, no free standing film was able to be formed. It was believed that the epoxy was not continuous and that the PEO-salt complex was not able to support the film. When the epoxy content is 20 weight percent or more, free standing films were formed.

The mechanical properties of these films improve as the percentage of epoxy contained increased. FIG. 1 shows the modulus as a function of fraction epoxy from 20 weight percent to 50 weight percent. At 50 weight percent epoxy the measured modulus is $2.5 \times 10^9$ dynes/cm. It agrees with the Young's modulus of a pure epoxy, $2 \times 10^9$ dynes/cm. At about 30 weight percent of epoxy phase the modulus of the polymer sample still has the value approaching that of the epoxy itself. The formation of free standing film with 20 weight percent or more epoxy is evidence that the polymer sample has an epoxy that is continuous network.

At room temperature the PEO-LiClO$_4$ complex is a viscous liquid. The dissociated Li$^+$ and ClO$_4^-$ ions provides ionic conductivity of $6 \times 10^{-4}$ S/cm. The viscosity of the PEO polymer increases when the salt is incorporated. The viscosity increase is due to the crosslinking effect by the dissolved ions. The AC electrical impedance spectrum of PEO-10 mole percent LiClO$_4$ shows a simple RC response with a small depression angle. The DC electrical conductivity is calculated from the minimum in the complex impedance plot.

Figure 2:
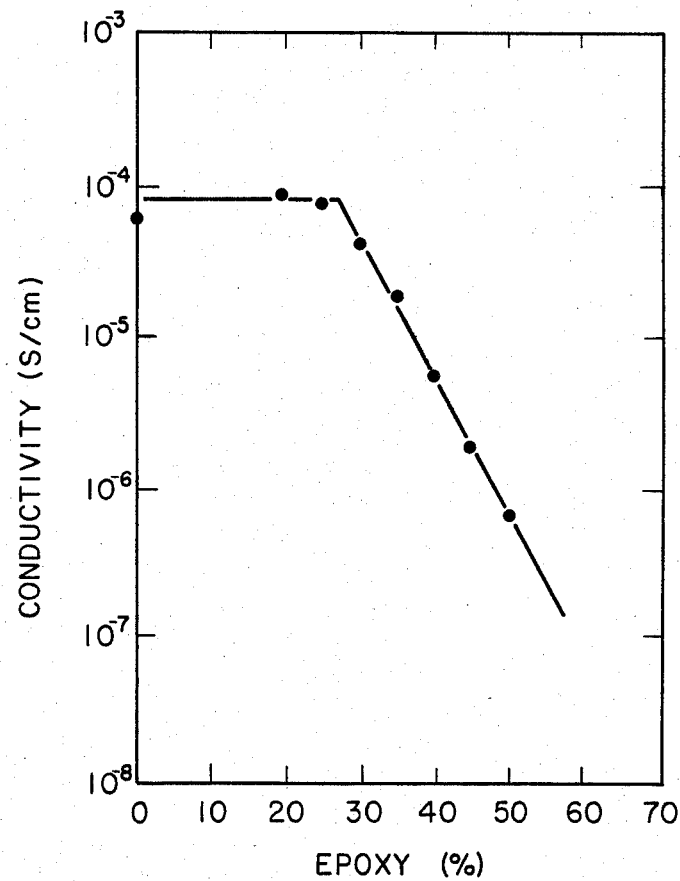
FIG. 2 shows a plot of electrical conductivity versus epoxy content for the same polymer mixtures.

FIG. 2 shows the DC electrical conductivity of the polymers as function of fraction epoxy from 20 weight percent to 50 weight percent. The conductivity of the polymer remains nearly constant from pure PEO-LiClO$_4$ to about 30 weight percent epoxy. Further increase in epoxy content leads to a exponential decrease in conductivity. The AC electrical impedance spectra of the polymers with up to 35 weight percent of epoxy shows the similar RC response as that of the polymer with no epoxy added. This behavior indicates that the polymers maintain a liquid-like conducting network. Above 40 weight percent of epoxy the impedance spectra of the polymers show evidence of distributed relaxation. This type of spectra is often observed in a polycrystalline ionic conductor which contains grain boundaries in their structure. It can be interpreted that the large amount of phase separated epoxy in the polymer is restricting the motion of ions in the conducting network.

A sample of 50 weight percent epoxy and 50 weight percent PEO-salt complex has been examined using transmission electron microscopy (TEM). Phase separation was observed on the size scale of 0.1 to 0.5 microns. The corresponding AC impedance spectrum of the polymer with 50 weight percent epoxy is highly depressed. The connection of PEO-salt phases are highly non-uniform since the impedence spectra did not exhibit two clearly separated RC responses. Also, the conductivity of the IPNs never dropped to the level of pure epoxy.

Therefore, co-continuous interpenetrating polymer networks are formed between epoxy and PEO-Li salt complexes with epoxy content ranging from 20 weight percent to 50 weight percent based on electrical and mechanical measurements. The optimum properties of electrolyte are in the vicinity of 30 weight percent epoxy and 70 weight percent PEO-LiClO$_4$ in the present system.

In these experiments the concentration of LiClO$_4$ salt was fixed at 10 mole percent. Although it was not optimized for the best conductivity, an IPN system with the conductivity of $1 \times 10^{-4}$ S/cm at room temperature has been obtained. This ionic conductivity is nearly ten times better than the values reported for the lithium salt such as polyphosphazine and polysiloxane.

EXAMPLE 2

Poly(methyl methacrylate)/LiClO$_4$-poly(ethylene oxide)

0.08 g LiClO$_4$, 2.44 g PEO-400 [poly(ethylene oxide); mol. wt. 400], and 0.002 g 2,2'-azobisisobutyronitrile (AIBN) are mixed in dry acetonitrile. The acetonitrile was removed in vacuum. 0.53 g methyl methacrylate (MMA) and 0.03 g butanedioldimethacrylate (BDM) were added. This composition gives 82 weight percent PEO-salt component and 18 weight percent MMA-BDM component. It was placed in a pressure bomb at 90° C. for 15.5 hours. The resulting solid polymeric films had conductivity of $4.2 \times 10^{-4}$ S/cm.

The procedure was repeated to produce solid polymeric films of (1) 28 weight percent of the poly(methyl methacrylate) (PMMA) component and 72 weight percent of the poly(ethylene oxide)-LiClO$_4$ component having a conductivity of $4.2 \times 10^{-4}$ S/cm; and (2) 48 weight percent of the poly(methyl methacrylate) component and 52 weight percent of the poly(ethylene oxide)-LiClO$_4$ component having a conductivity of $8.9 \times 10^{-5}$ S/cm.

Obviously numerous modifications and variations of the present invention are possible in light of the above teachings. It is therefore to be understood that within the scope of the appended claims the invention may be practiced otherwise than as specifically described herein.

What is claimed and desired to be secured by Letters Patent of the United States is:

1. A solid polymeric electrolyte comprising: a two phase interpenetrating polymer network of
   (1) a mechanically supporting phase of a continuous network of a crosslinked polymer selected from the group consisting of epoxies, polyurethanes, polymethacrylates, polyacrylates, polyacrylonitriles, and polystyrenes; and
   (2) an ionic conducting phase comprising
      (a) a metal salt complexing liquid polymer selected from the group consisting of poly(ethylene oxide), poly(propylene oxide), poly(ethylene imine), and mixtures thereof,
      complexed with
      (b) a metal salt selected from the group consisting of LiI, LiBr, LiClO$_4$, CsClO$_4$, NaI, NaBr, CsI, CsBr, KI, KBr, LiCF$_3$SO$_3$, LiSCN, CsSCN, NaSCN, KSCN, AgNO$_3$, CuCl$_2$, CoCl$_2$, Mg(ClO$_4$)$_2$, PbBr$_2$, MgCl$_2$, and mixtures thereof,
   wherein from more than zero to 0.50 moles of metal salt are added per mole of monomer repeat unit of the metal salt complexing liquid polymer;
   wherein the mechanically supporting phase comprises from 20 to 55 weight percent of the solid polymeric electrolyte with the ion conducting phase being essentially the remainder, and
   wherein the mechanically supporting phase forms a matrix which supports the interpenetrating ionic conducting phase which provides continuous paths of high conductivity in all directions throughout the matrix.

2. The solid polymeric electrolyte of claim 1 wherein the mechanically supporting phase comprises from 25 to 40 weight percent of the solid polymeric electrolyte.

3. The solid polymeric electrolyte of claim 2 wherein the mechanically supporting phase comprises from 28 to 35 weight percent of the solid polymeric electrolyte.

4. The solid polymeric electrolyte of claim 1 wherein the crosslinked polymer of the mechanically supporting phase is selected from the group consisting of epoxies, polymethacrylates, polyacrylates, and polyacrylonitrile.

5. The solid polymeric electrolyte of claim 4 wherein the crosslinked polymer of the mechanically supporting phase is selected from the group consisting of poly(methyl methacrylate) and polyamine cured epoxies.

6. The solid polymeric electrolyte of claim 1 wherein the metal salt complexing liquid polymer is selected form the group consisting of poly(ethylene oxide) and poly(propylene oxide).

7. The solid polymeric electrolyte of claim 6 wherein the metal salt complexing liquid polymer is poly(ethylene oxide).

8. The solid polymeric electrolyte of claim 1 wherein the metal salt is selected from the group consisting of LiI, LiBr, LiClO$_4$, NaI, NaBr, LiCF$_3$SO$_3$, LiSCN, NaSCN, KSCN, PbBr$_2$, and MgCl$_2$.

9. The solid polymeric electrolyte of claim 8 wherein the metal salt is selected from the group consisting of LiI, LiClO$_4$, NaI, NaBr, and LiCF$_3$SO$_3$.

10. The solid polymeric electrolyte of claim 9 wherein the metal salt is selected from the group consisting of LiClO$_4$ and LiCF$_3$SO$_3$.

11. The solid polymeric electrolyte of claim 1 wherein from 0.01 to 0.30 moles of metal salt are added per mole of monomer repeat unit of the metal salt complexing liquid polymer.

12. The solid polymeric electrolyte of claim 11 wherein from 0.03 to 0.10 moles of metal salt are added per mole of monomer repeat unit of the metal salt complexing liquid polymer.

13. The solid polymeric electrolyte of claim 12 wherein about 0.05 moles of metal salt are added per mole of monomer repeat unit of the metal salt complexing liquid polymer.

* * * * *